(12) United States Patent
Wang

(10) Patent No.: US 6,920,797 B1
(45) Date of Patent: Jul. 26, 2005

(54) SELECTING AN AIRFLOW GENERATOR FOR A SYSTEM

(75) Inventor: David G. Wang, San Diego, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/202,806

(22) Filed: Jul. 25, 2002

(51) Int. Cl.⁷ ............................................. G01F 1/00
(52) U.S. Cl. ....................................................... 73/861
(58) Field of Search ........................ 415/221; 702/132; 73/204.17, 861.04, 147, 862.043, 861

(56) References Cited

U.S. PATENT DOCUMENTS

| | | | |
|---|---|---|---|
| 5,861,556 A * | 1/1999 | Nukui et al. ............. | 73/204.17 |
| 5,929,342 A * | 7/1999 | Thompson ............... | 73/861.04 |
| 5,948,996 A * | 9/1999 | Takeuchi et al. ........ | 73/862.043 |
| 6,101,459 A * | 8/2000 | Tavallaei et al. ........... | 702/132 |
| 6,169,962 B1 * | 1/2001 | Brookshire et al. ........... | 702/47 |
| 6,256,181 B1 * | 7/2001 | Chinomi et al. .............. | 361/23 |
| 6,293,753 B1 * | 9/2001 | Pal et al. ..................... | 415/221 |
| 6,341,900 B1 * | 1/2002 | Singers et al. .............. | 345/418 |
| 6,470,740 B2 * | 10/2002 | Li ................................. | 73/147 |

OTHER PUBLICATIONS

Nidec America, "Air Performance and Package Resistance," dated as least as early as May 17, 2002, and printed from http:/www.nidec.com/airperformance.html, pp. 1-4.

* cited by examiner

Primary Examiner—Edward Lefkowitz
Assistant Examiner—Jewel Thompson
(74) Attorney, Agent, or Firm—Trop, Pruner & Hu, P.C.; John D. Cowart

(57) ABSTRACT

A test apparatus includes a plurality of sensors placed proximate an airflow generator (e.g. a fan) to measure flow rates in respective sub-regions. The test apparatus also includes a controller (e.g., test software) to calculate an operating point of the airflow generator based on flow rate data from the sensors and to determine if the operating print falls within a predefined operating range of the airflow generator. Based on this determination, the controller is able to indicate if the airflow generator is appropriate for use in a given system chassis.

15 Claims, 5 Drawing Sheets

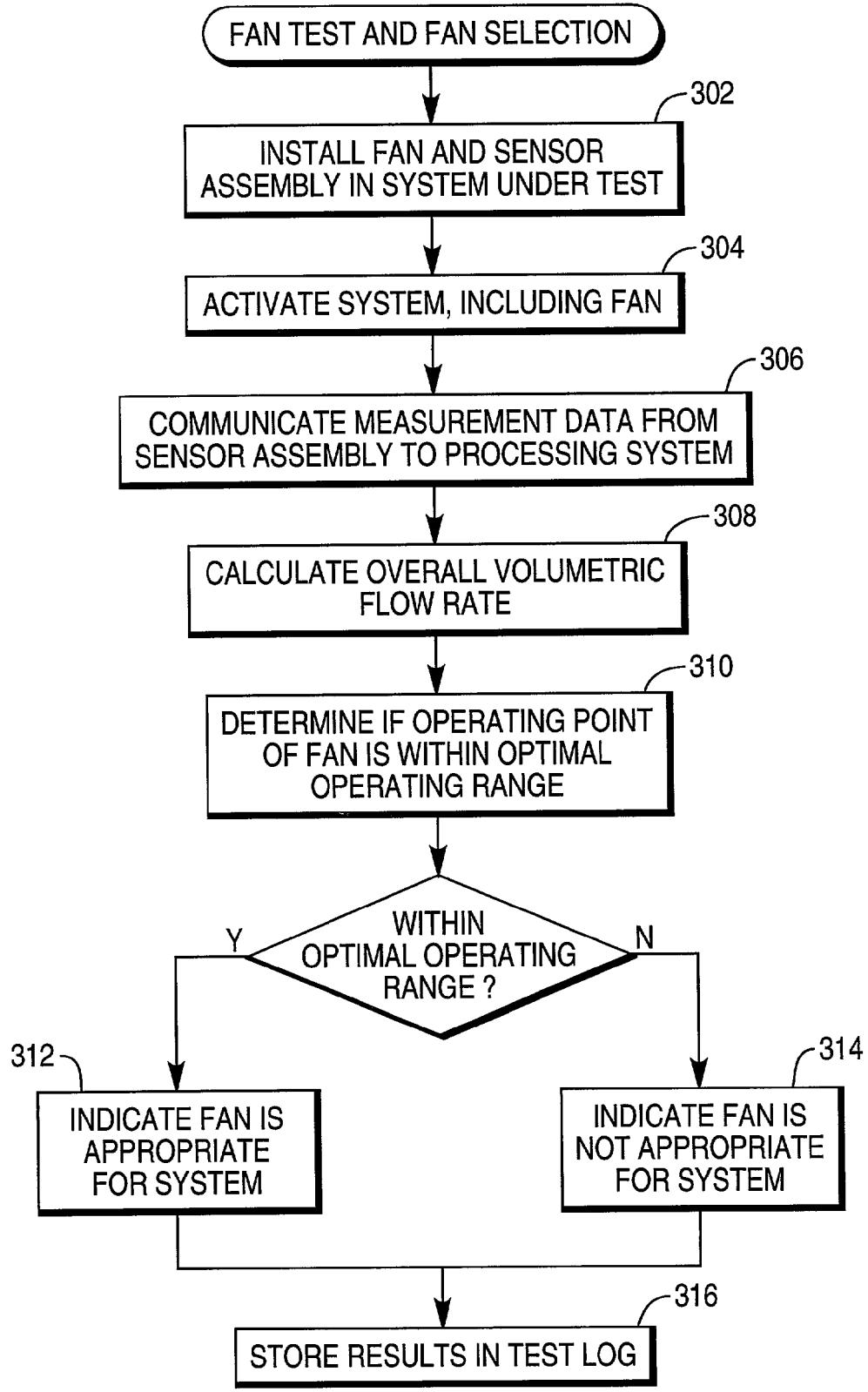

SELECTING AN AIRFLOW GENERATOR FOR A SYSTEM

BACKGROUND

A consideration in the design of an electronic system, such as a computer system and server, is the implementation of a heat dissipation apparatus in the system. Generally, there are many electronic components in a system, with each component generating heat during operation. To prevent damage to the components, a heat dissipation apparatus is used. Typically, a heat dissipation apparatus includes an airflow generator, such as a fan, to generate a flow of air to transport heat away from the heat-producing components, which are usually thermally contacted to heat sinks or heat spreaders. Often, there are multiple airflow generators (e.g., fans) within a system to generate airflow in different parts of the system.

One of the issues associated with any system is the presence of obstacles to airflow. Many systems, such as servers, notebook or laptop computer systems, or personal digital assistants (PDAs), have continued to decrease in size while their performance levels have continued to increase. A smaller size means that a greater density of components are packed within a chassis of a given system. The components in a small space act as obstacles to airflow, resulting in an increase of resistance or impedance to airflow generated by one or more airflow generators in the system. Consequently, system designers face increasing challenges in the selection of appropriate airflow generators.

Selection of an airflow generator that does not have the ability to provide adequate airflow within a system means that a greater burden is placed on the airflow generator. Usually, this means reduced reliability, greater noise emission, and reduced system cooling performance. On the other hand, selection of an airflow generator that has too much capacity may result in larger and more airflow generators than necessary resulting in higher cost and lower packaging density.

SUMMARY

In general, an improved method and apparatus is provided in selecting an airflow generator (or airflow generators) for a given system to achieve optimal volumetric airflow for a given thermal load of the system. For example, a method of selecting an airflow generator for a system chassis includes arranging a plurality of sensors proximate an airflow generator mounted in the system chassis. An overall flow rate of the airflow generator is determined based on data from the plurality of sensors, the overall flow rate being an operating point of the airflow generator. The method further includes determining if the operating point falls within a predefined operating range based on information representing a characteristic of the airflow generator.

Other or alternative features will become apparent from the following description, from the drawings, and from the claims.

BRIEF DESCRIPTION OF THE DRAWINGS

FIG. 6 is a flow diagram of a process of determining operating points of fans and of selecting one or more fans for a given system.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
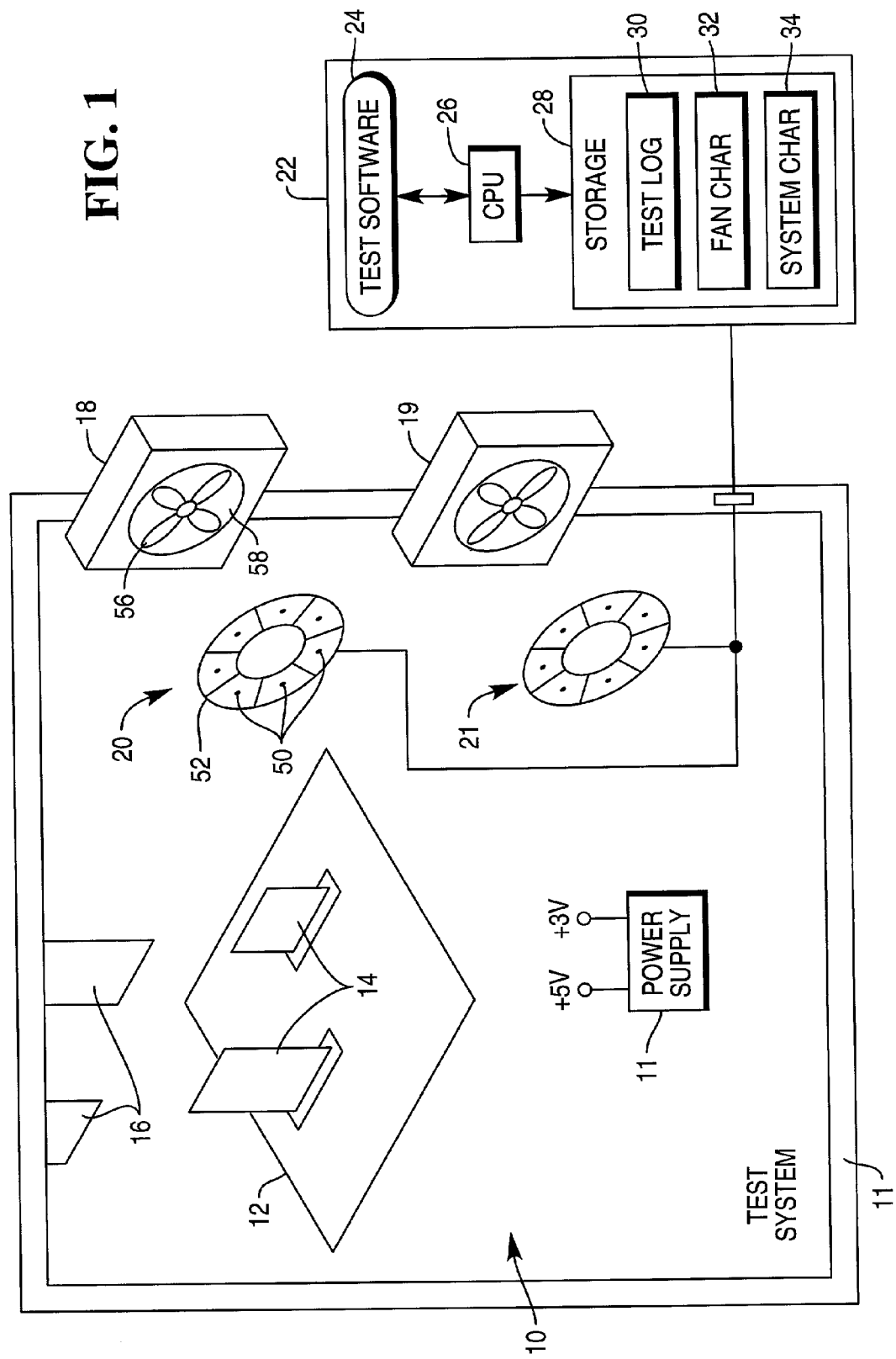
FIG. 1 is a block diagram of an example test arrangement including a system under test and a processing system, in accordance with one embodiment.

As shown in FIG. 1, a test arrangement according to some embodiments includes a system 10 under test that is connected to a processing system 22. The system 10 under test has an arrangement that is identical to that of an actual system that is being developed, except that the system 10 under test may have sensors placed at various locations in the system, with the sensors coupled to provide measured data to the processing system 22. Example sensors include those in a sensor assembly 20 for measuring airflow rates from an airflow generator 18, usually a fan.

The airflow generator 18 is mounted to a chassis 11. The system chassis 11 further contains other components, including a main board 12 on which are mounted various devices 14. The system chassis 11 also contains other components 16 that are attached to other parts of the chassis 11. A power supply 11 produces power supply voltages (e.g., 3V, 5V) to provide power to the system components. The main board 12, components 14 and 16, as well as other components (not shown) are usually mounted in a limited amount of space. The relatively high density of components in a small space creates obstacles to airflow, and thus increases impedance to airflow.

The airflow generator 18, when activated, creates a flow of air around heat-producing components in the system 10. Such components are usually thermally contacted to some type of heat spreader or heat sink to enhance dissipation of heat due to the forced airflow from the airflow generator 18. Optionally, another airflow generator 17 is also present in the system 10.

When designing the system 10, an important consideration is the selection of an appropriate airflow generator 18 for the system 10. Sometimes, multiple airflow generators (18 and 19) may be provided in the system 10. It is desired that the airflow generator 18 be able to generate at least a target airflow rate or velocity despite the airflow impedance imposed by the arrangement of components in the chassis 11.

In practice, measurement of volumetric airflow within a system is not a trivial task. This is due to the presence of various components of the system 10 that create impedance to airflow, as well as the presence of multiple airflow generators that cause interaction of airflow generated by the multiple airflow generators. Without proper measurement of either volumetric airflow or pressure drop, selection of airflow generators in the design of electronic equipment is often based on guesswork and thus may not be optimal.

To enhance the accuracy of volumetric airflow measurement, the sensor assembly 20 having multiple sensors 50 is placed proximate the airflow generator 18. If the second airflow generator 19 is also in the system 10, then another sensor assembly 21 is positioned proximate the airflow generator 19. In the illustrated example of FIG. 1, the set 50 of sensors are in a generally ring-shaped arrangement. The sensors 50 are mounted to a generally ring-shaped frame 52. The frame 52 of the sensor assembly 20 can be a wire frame, a frame made of a thin sheet metal, or some other type of frame. For optimal performance, the sensor assembly 20 is placed as close as possible to an airflow outlet 54 of the airflow generator 18. The airflow generator 18 also includes blades 56 mounted on a rotatable support 58. When rotated, the blades 56 generate an airflow through the outlet 58. The flow of air passes through the sensor assembly 20.

The total area of airflow output from the airflow generator 18 is divided into multiple sub-regions, with one sensor 50 positioned to measure airflow through a corresponding sub-region. By employing multiple sensors 50, close to 100% of the air output of the airflow generator 18 is passed through the sensors 50 and thus more accurate air velocity measurements are possible. In one example implementation, each sensor 50 includes a thermistor device, such as that provided by Cambridge AccuSense, Inc. However, other types of sensors 20 can be used in other embodiments. Instead of the ring-shaped arrangement shown in FIG. 1, a circular arrangement, a rectangular arrangement, or other arrangement can be used.

The sensor assembly 20 is electrically connected by electrical lines 60 to the processing system 22. The electrical lines 60 can be connected to respective ports of the systems 10 and 22, such as serial ports, parallel ports, or other ports. The processing system 22 includes test software 24 executable on a central processing unit (CPU) 26. The CPU 26 is connected to a storage 28, which is capable of storing test results in a test log 30, with the test results generated by the test software 24 in response to data received from the sensor assembly 20. The storage 28 also stores a first set of information 32 relating to characteristics of the airflow generator, and a second set of information 34 relating to characteristics of the system 10 under test.

In another embodiment, instead of the test software 26 and associated information being part of the processing system 22 that is separate from the system 10 under test, the test software 26 and associated information can be part of the system 10 under test.

Using the first and second sets 32 and 34 of characteristics information, an operating point of each airflow generator 18 is derived from the airflow rate data received from the sensor assembly 20. From this, the processing system 22 can determine if the airflow generator 18 is operating within a predefined optimal operating range. The goal is to select one or more airflow generators for the system 10 that are able to operate within an optimal operating region of each airflow generator for the given system 10 and its internal arrangement of components. If an airflow generator that is tested is determined to be operating within the optimal operating region, then the airflow generator is indicated by the processing system 22 as being appropriate for use in the system 10 under test.

In the ensuing discussion, reference is made to fans; however, the discussion also applies to other types of airflow generators.

Figure 2:
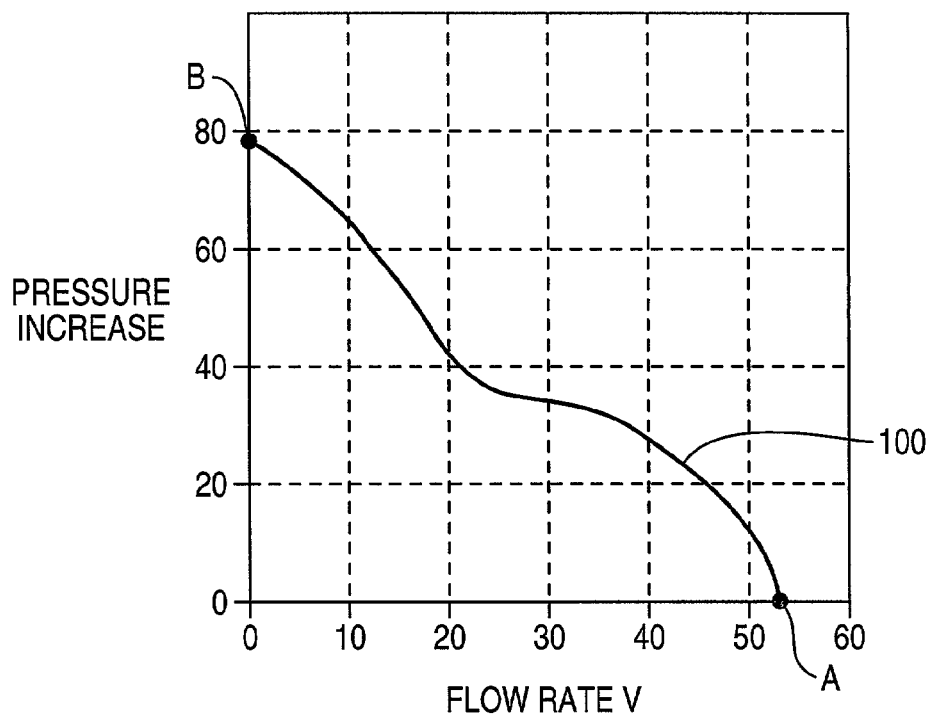
FIG. 2 is a graph of a characteristic curve for a fan.

Both the first and second sets of information 32 and 34 represent characteristic curves. FIG. 2 is a graph of a characteristic fan curve 100 of a fan. The horizontal axis represents the volumetric airflow rate (e.g., in cubic feet per minute or cfm) and the vertical axis represents the pressure drop (expressed, for example, in inches of water column). The fan curve 100 indicates that, as the pressure drop which is representative of the flow impedance of the system decreases, the volumetric flow rate increases. In operation, a fan delivers a certain volumetric airflow through certain airflow impedance represented by the static pressure in the vertical column of the graph. When the flow impedance or pressure drop of the system is reduced, the flow rate increases; conversely, the flow rate of the fan is diminished if there is an increase in flow impedance. For a given fan, the volumetric flow reaches the maximum when the static pressure is zero (that is, there is no impedance to airflow within the system chassis 11). This is indicated by point A on the fan curve 100. On the other hand, the volumetric flow reaches the minimum or zero when the static pressure is the maximum that the fan is designed to be able to handle (assuming maximum impedance to airflow). This is represented by point B on the fan curve 100.

The characteristic fan curve 100 shown in FIG. 2 is for a given fan operating at a certain voltage. The same fan will have different characteristic fan curves for different operating voltages. Also, different fans will have different characteristic fan curves. The first set of information 32 contains the characteristic curves of the fans that a user desires to test.

Figure 3:
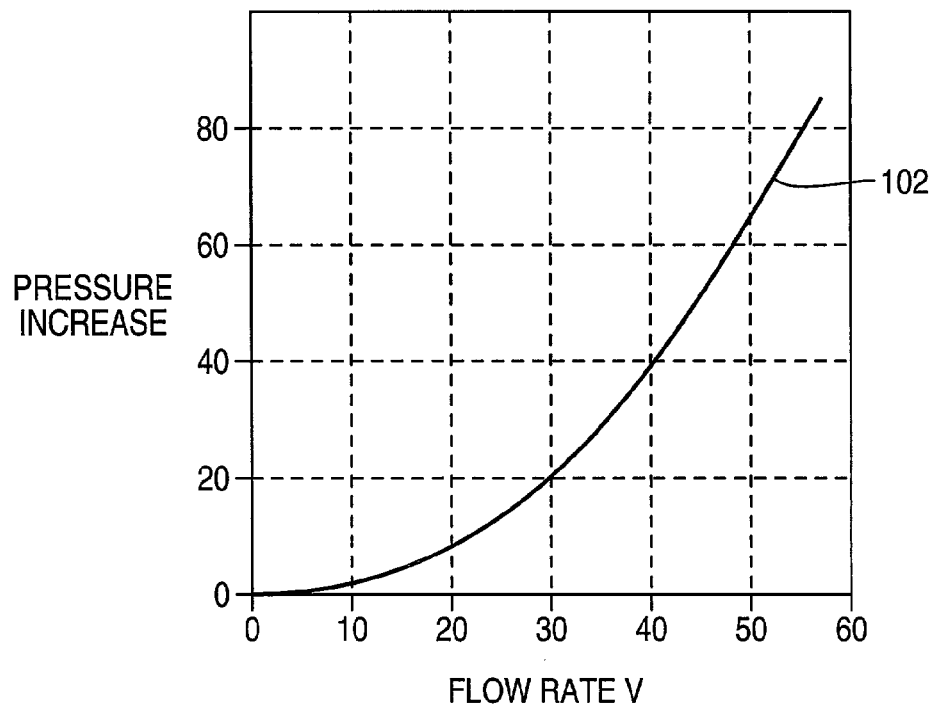
FIG. 3 is a graph of a characteristic curve for a system chassis.

FIG. 3 is a graph of a characteristic device or system curve 102 of the system 10 under test. The system 10 contains one or more obstacles to airflow. The horizontal axis of the graph shown in FIG. 3 represents the volumetric airflow rate, and the vertical axis of the graph represents the pressure drop. The pressure drop experienced by air flowing past an obstacle is generally proportional to the square of air velocity. Thus, the curve of the relationship between the flow rate and the pressure drop is a parabolic relationship, as illustrated by the device curve 102 of FIG. 3. Thus, as represented by the device curve 102, an increase in volumetric flow rate means an increase in pressure drop across an obstacle.

The obstacles to airflow create impedance to airflow generated by a fan. An operating point of the fan is determined by an intersection point (point C in FIG. 4) between the characteristic fan curve 100 and the characteristic device or system curve 102. It is desirable that the operating point C falls within an optimal operating range of the fan, as indicated by two lines 106 and 108. The optimal operating range includes any point on the curve 100 between the two boundary lines 106 and 108. A fan operating outside the optimal operating range may exhibit undesirable characteristics, such as reduced airflow delivery, greater noise emission, reduced fan reliability, reduced cooling performance, and/or excessive power usage.

Figure 4:
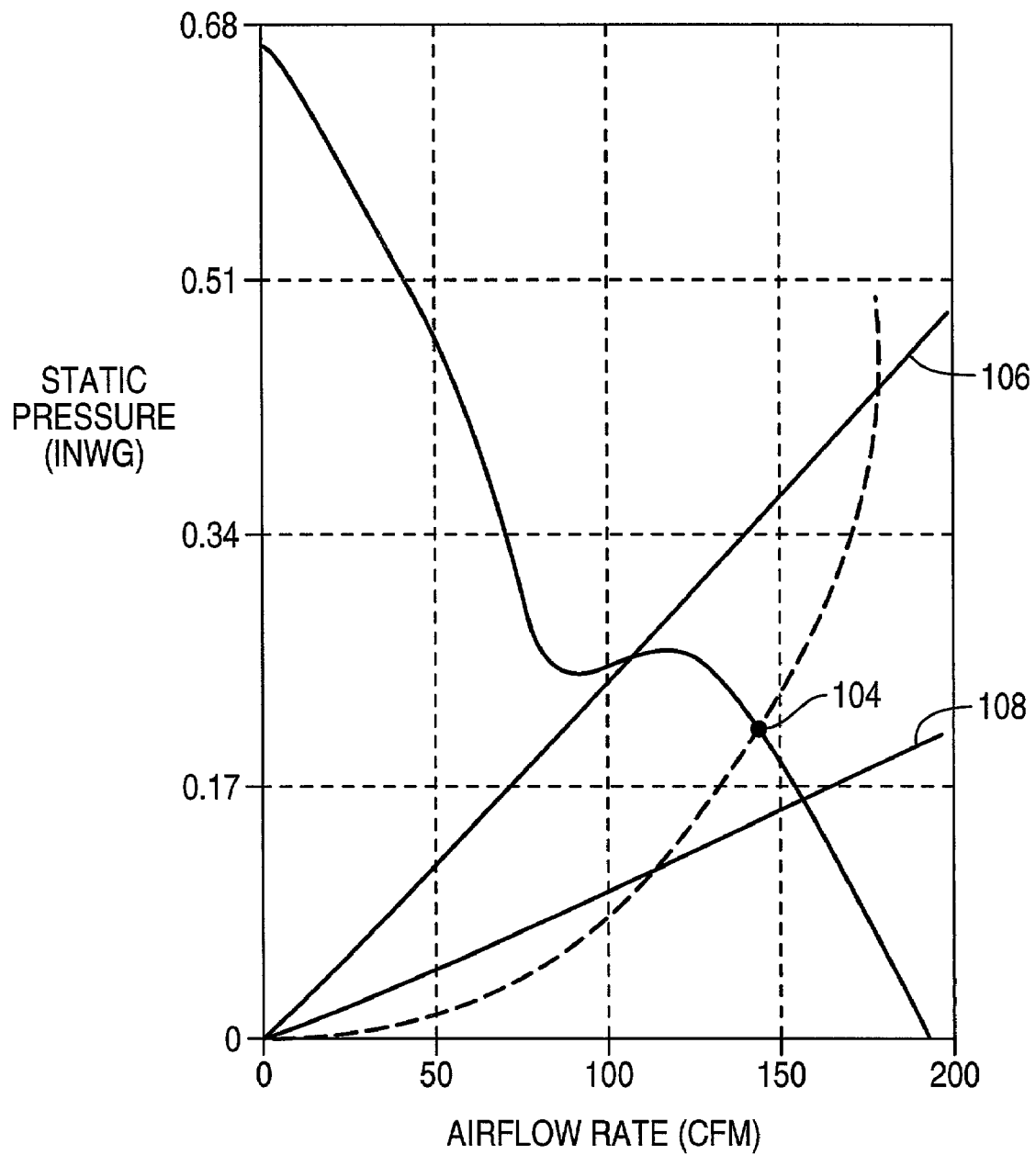
FIG. 4 is a graph showing an intersection of the graphs of FIGS. 2 and 3 when the fan is installed in the system chassis.

The intersection point C of the fan characteristic curve 100 and the system characteristic curve 102 define the operating point of the fan when the fan is installed in the system 10. At the operating point C, the pressure loss caused by obstacles in the system 10 is compensated by the pressure increase of the fan which results in the actual flow rate of the fan and system combination as shown in FIG. 4. In the example, the operating point C indicates operation of the fan at about 145 cfm. This is the actual volumetric flow rate delivered by the fan that is installed in the system 10.

As shown in FIG. 4, the operating point C falls between the boundary lines 106 and 108. As a result, when this fan is installed in the system 10, the fan operates within its optimal operating range and thus is an appropriate fan for use in the system 10.

If the same fan operating at a different voltage or a different fan with a different fan characteristic curve 100 is tested, then the intersection of the fan characteristic curve 100 and the system characteristic curve 102 may fall outside the optimal operating range of the fan. Such a fan would not be appropriate for use in the system 10.

Figure 5:
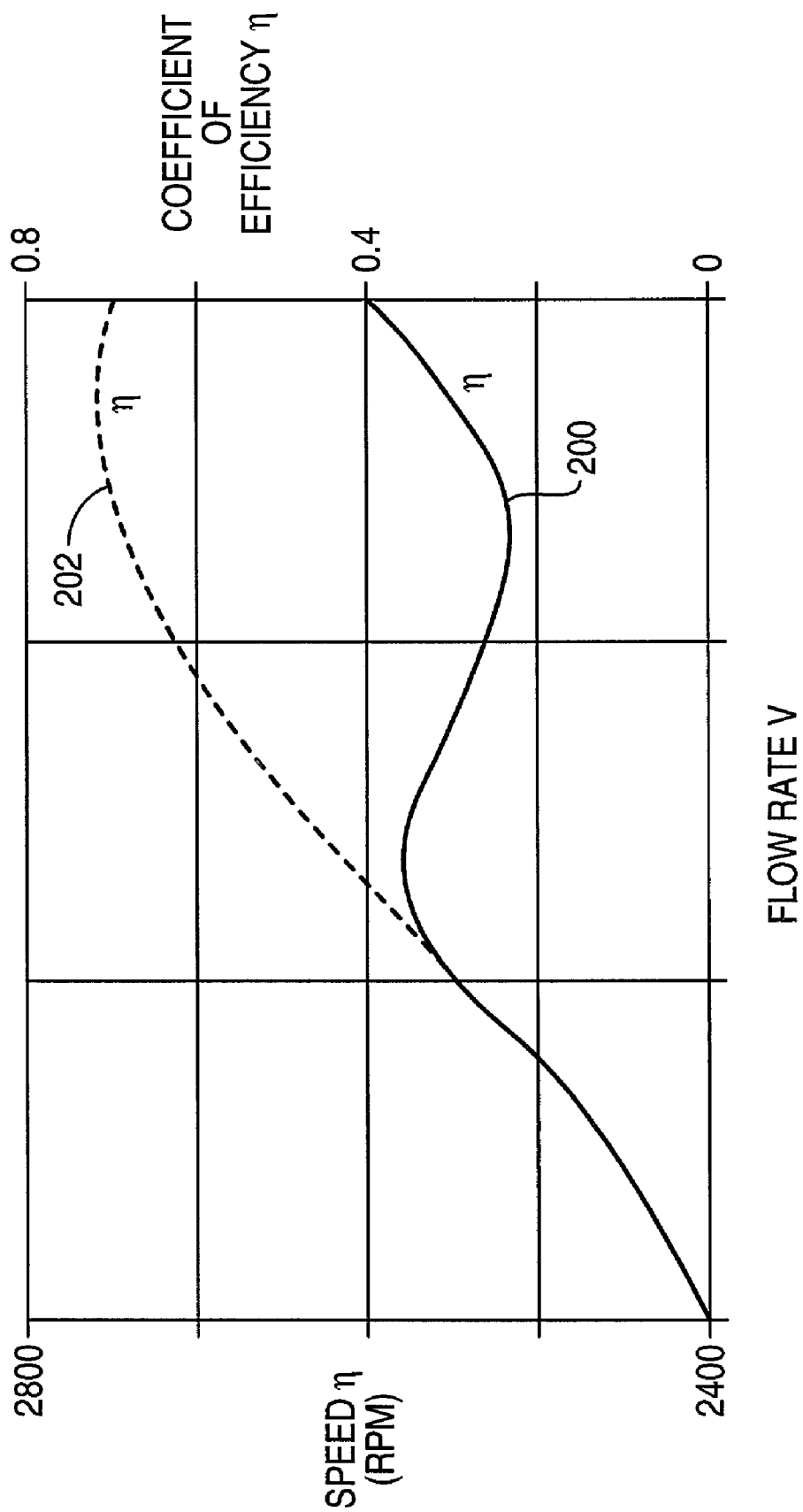
FIG. 5 is a graph illustrating the relationships between fan efficiency and flow rate and between fan speed and flow rate.

The optimal operating range is dependent upon the rotational speed of the fan and efficiency of the fan in delivering a given volumetric flow rate. FIG. 5 shows two curves: a curve 200 that represents the fan speed n (e.g., revolutions per minute or rpm) relative to the volumetric flow rate; and a curve 202 that represents the fan efficiency η relative to the volumetric flow rate. Based on these curves 200 and 202, a system designer can select what region of the fan characteristic curve 100 is part of the optimal operating range.

As shown in FIG. 6, to select a fan from among a group of candidate fans, each fan is installed (at 302) in the system 10 and tested. A sensor assembly, such as the one shown in FIG. 1, is placed proximate each of such fans mounted in the system 10. Once the fan is mounted in the system 10, the system 10 is activated (at 304), with the fan turned on. Each sensor 50 of the sensor assembly 20 measures the airflow in its respective sub-region and communicates (at 306) the airflow measurement data to the processing system 22. The test software 24 in the processing system 22 collects the airflow measurement data from the individual sensors 50. The volumetric flow rate through each sub-region of the sensor assembly 20 is obtained by multiplying the measured airflow velocity by each corresponding cross-sectional area. The test software 24 calculates (at 308) the overall volumetric airflow rate of the fan by summing the volumetric flow rates of all the sub-regions.

The overall volumetric flow rate calculated from the measurement data received from the multiple sensors 50 represents the operating point of the fan. The test software 24 determines (at 310) if the operating point falls within the optimal operating range along the fan curve 100 (stored as the first set of information 32).

If the test software 24 determines that the operating point is within the fan's optimal operating range, then the test software 24 indicates (at 312) that the tested fan is appropriate for use in the system 10 under test. However, if the operating point falls outside the optimal operating region, then the test software 24 indicates (at 314) that the fan is not appropriate for use in the system 10 under test. This indication can be a visual indication, an audio indication, or some other type of indication. The test software 24 then stores (at 316) the test results in the test log 30.

Instead of selecting a different fan from among a group of candidate fans, it may also be possible to use the technique above to select an operating voltage of a fan by testing the fan at various different voltages (such as 3V and 5V from power supply 11 in FIG. 1). It may be determined that a fan may be optimally used in a given system at one voltage but not at another voltage. In yet a further implementation, selection can be of one fan among a group of candidate fans along with selection of an appropriate voltage for the selected fan.

Instructions of the test software 24 are stored on the storage 28 and loaded for execution by the CPU 26. The CPU 26 includes a microprocessor, microcontroller, processor module or subsystem (including one or more microprocessors or microcontrollers), or another control or computing device. As used here, a "controller" refers to hardware, software, or a combination thereof. A "controller" can refer to a single component or to plural components (whether software or hardware).

The storage 28 is implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method of selecting an airflow generator for a system chassis, comprising:
   providing a plurality of sensors proximate an airflow generator mounted in the system chassis;
   determining an overall flow rate of the airflow generator based on data from the plurality of sensors, the overall flow rate being an operating point of the airflow generator; and
   determining if the operating point falls within a predefined operating range based on information representing a characteristic of the airflow generator;
   wherein providing the plurality of sensors comprises placing the sensors in close proximity to the airflow generator to capture substantially all of the airflow output from the airflow generator and arranging the sensors in a generally ring-shaped arrangement.

2. A method of selecting an airflow generator for a system chassis, comprising:
   providing a plurality of sensors proximate an airflow generator mounted in the system chassis;
   determining an overall flow rate of the airflow generator based on data from the plurality of sensors, the overall flow rate being an operating point of the airflow generator;
   determining if the operating point falls within a predefined operating range based on information representing a characteristic of the airflow generator;
   providing a second set of sensors proximate a second airflow generator fan mounted in the system chassis;
   determining an overall flow rate of the second airflow generator fan based on data from the second set of sensors, the overall flow rate of the second airflow generator being an operating point of the second airflow generator; and
   determining if the operating point of the second airflow generator falls within a predefined operating range of the second airflow generator.

3. A method of selecting an airflow generator for a system chassis, comprising:
   providing a plurality of sensors proximate an airflow generator mounted in the system chassis;
   determining an overall flow rate of the airflow generator based on data from the plurality of sensors, the overall flow rate being an operating point of the airflow generator;
   determining if the operating point falls within a predefined operating range based on information representing a characteristic of the airflow generator; and
   testing the airflow generator at multiple operating voltages, wherein the characteristic of the airflow generator differs at different voltages.

4. A test apparatus, comprising:
   a system chassis;
   an airflow generator positioned in the system chassis;

components positioned in the system chassis, the components providing impedance to airflow generated by the airflow generator;

a plurality of sensors placed proximate the airflow generator to measure flow rates in respective sub-regions; and a controller to receive flow rate data from the sensors and to calculate an overall flow rate of the airflow generator based on the flow rate data from the sensors, the overall flow rate being an operating point of the airflow generator;

the controller to determine if the operating point falls within a predefined operating range of the airflow generator.

5. The test apparatus of claim 4, the controller to indicate that the airflow generator is appropriate for use in the system chassis if the operating point falls within the predefined operating range.

6. The test apparatus of claim 5, the controller to indicate that the airflow generator is not appropriate for use in the system chassis if the operating point falls outside the predefined operating range.

7. The test apparatus of claim 4, further comprising a system-under-test, the system-under-test including the system chassis, airflow generator, the components, and the plurality of sensors;

the controller being in a test system separate from the system-under-test.

8. The test apparatus of claim 7, wherein the controller comprises test software.

9. The test apparatus of claim 4, further comprising a storage to store information representing a characteristic of the airflow generator, the controller to determine if the operating point falls within the predefined operating range based on the information representing the characteristic of the airflow generator.

10. The test apparatus of claim 9, wherein the characteristic of the airflow generator comprises a relationship of the overall flow rate to pressure drop, the pressure drop due to the impedance caused by the components.

11. The test apparatus of claim 4, wherein the plurality of sensors are placed in close proximity to the airflow generator to capture substantially all of the airflow output from the airflow generator.

12. The test apparatus of claim 4, wherein the airflow generator is a tube-axial fan.

13. The test apparatus of claim 12, wherein the plurality of sensors are in generally a ring-shaped arrangement, with an area of the ring-shaped arrangement covering an outlet area of the tube-axial fan.

14. The test apparatus of claim 4, wherein the sensors comprise velocity sensors.

15. A test apparatus, comprising:

a system chassis;

an airflow generator positioned in the system chassis;

components positioned in the system chassis, the components providing impedance to airflow generated by the airflow generator;

a plurality of velocity sensors placed proximate the airflow generator to measure flow velocities in respective sub-regions; and a controller to receive flow velocity data from the velocity sensors and to calculate a flow rate associated with each velocity sensors by multiplying the velocity data and area of the respective sub-region, and to calculate an overall flow rate delivered by the airflow generator based on the flow rate data over each sub-region, the overall flow rate determining an operating point of the airflow generator;

the controller to determine if the operating point falls within a predefined operating range of the airflow generator.

* * * * *